(12) United States Patent
Faughey et al.

(10) Patent No.: US 6,330,960 B1
(45) Date of Patent: Dec. 18, 2001

(54) SQUEEZE DISPENSER

(75) Inventors: Michael Faughey, Harleysville, PA (US); John Lonczak, Newburgh, NY (US)

(73) Assignee: McNeil-PPC, Inc., Skillman, NJ (US)

( * ) Notice: Subject to any disclaimer, the term of this patent is extended or adjusted under 35 U.S.C. 154(b) by 0 days.

(21) Appl. No.: 09/325,868

(22) Filed: Jun. 4, 1999

(51) Int. Cl.⁷ ........................................ B67B 5/06
(52) U.S. Cl. .................. 222/205; 222/207; 222/158; 222/211; 222/438; 222/23
(58) Field of Search ........................ 222/207, 205, 222/158, 211, 434, 438, 454, 182, 23; 215/224, 265, 317, 303, 305; 220/281, 784, 786

(56) References Cited

U.S. PATENT DOCUMENTS

| | | |
|---|---|---|
| D. 278,118 | 3/1985 | Hoyt ........................ D9/403 |
| D. 316,815 | 5/1991 | Kalin et al. ................ D9/404 |
| 1,495,772 | 5/1924 | Brown . |
| 1,724,766 | 8/1929 | McCauley . |
| 1,917,672 | 7/1933 | Stewart . |
| 2,123,737 | 7/1938 | Lewis ........................ 221/147 |
| 2,521,433 | 9/1950 | White ........................ 222/43 |
| 2,605,763 | 8/1952 | Smoot ........................ 128/173 |
| 2,968,423 | 1/1961 | Mahler et al. ............. 222/49 |
| 2,989,215 | 6/1961 | Willingham ................ 222/207 |
| 3,097,763 | 7/1963 | Aluotto ...................... 222/43 |
| 3,101,751 | 8/1963 | Ballin ........................ 141/24 |
| 3,141,579 | 7/1964 | Medlock .................... 222/207 |
| 3,233,797 | 2/1966 | Conry ........................ 222/477 |
| 3,321,113 | 5/1967 | Conry ........................ 222/477 |
| 3,458,090 | 7/1969 | Scoggin ..................... 222/309 |
| 3,492,876 | 2/1970 | Bull et al. .................. 73/425.6 |
| 3,543,964 | 12/1970 | Schlossmacher ........... 222/41 |
| 3,556,353 | 1/1971 | Echols ....................... 222/309 |
| 3,628,700 | * 12/1971 | Dodoghue ................. 222/207 |
| 3,653,556 | 4/1972 | Moran et al. .............. 222/309 |
| 3,863,807 | 2/1975 | Shapiro et al. ............ 222/43 |
| 3,885,715 | * 5/1975 | Lowry ....................... 220/784 |
| 4,081,111 | 3/1978 | Sandow ..................... 222/309 |
| 4,096,751 | 6/1978 | Withers et al. ............ 73/425.6 |

(List continued on next page.)

FOREIGN PATENT DOCUMENTS

0335505 A1 * 10/1989 (EP) ...................... 222/207

Primary Examiner—Kevin Shaver
Assistant Examiner—Melvin A. Cartegena
(74) Attorney, Agent, or Firm—Michele G. Mangini

(57) ABSTRACT

The present invention provides a flexible container for dispensing liquids capable of providing precise dosage of the liquid. The container comprises an upper liquid reservoir and a lower liquid reservoir separated by a gasket, a longitudinal tube extending through the gasket and comprising a slot, and a dispensing tip having a longitudinal sleeve extending therefrom that also comprises a slot and is disposed concentrically around the upper end of the longitudinal tube. Liquid may be transferred from the lower reservoir to the upper reservoir by the application of pressure on the lower reservoir while the two slots are aligned. In a preferred embodiment, the container is rendered child-resistant through the provision of a cap.

16 Claims, 11 Drawing Sheets

U.S. PATENT DOCUMENTS

| | | | | |
|---|---|---|---|---|
| 4,106,673 | * | 8/1978 | Donoghue | 222/207 |
| 4,143,794 | * | 3/1979 | Stratford et al. | 222/42 |
| 4,143,797 | | 3/1979 | Reed | 222/207 |
| 4,185,755 | | 1/1980 | Sachs et al. | 222/43 |
| 4,211,346 | | 7/1980 | Mehra et al. | 222/205 |
| 4,243,157 | | 1/1981 | Rettberg | 222/44 |
| 4,358,027 | | 11/1982 | Poitras | 222/43 |
| 4,407,435 | | 10/1983 | Harmon | 222/481 |
| 4,418,843 | * | 12/1983 | Jackman | 222/158 |
| 4,427,041 | | 1/1984 | Coetzee | 141/294 |
| 4,433,799 | | 2/1984 | Corsette | 222/309 |
| 4,445,626 | | 5/1984 | Steffen et al. | 222/39 |
| 4,454,964 | | 6/1984 | Sacher | 222/43 |
| 4,456,152 | | 6/1984 | Young et al. | 222/309 |
| 4,474,312 | | 10/1984 | Donoghue | 222/205 |
| 4,526,294 | | 7/1985 | Hirschmann et al. | 222/47 |
| 4,607,762 | | 8/1986 | Zulauf et al. | 222/48 |
| 4,684,046 | | 8/1987 | Foster et al. | 222/451 |
| 4,747,521 | | 5/1988 | Saffron | 222/205 |
| 4,871,092 | | 10/1989 | Maerte | 222/153 |
| 4,936,490 | | 6/1990 | Battegazzore | 222/205 |
| 5,000,353 | | 3/1991 | Kostanecki et al. | 222/207 |
| 5,007,757 | | 4/1991 | Iizuka | 401/278 |
| 5,044,521 | | 9/1991 | Peckels | 222/23 |
| 5,050,782 | | 9/1991 | Cheng | 222/309 |
| 5,054,656 | | 10/1991 | Lasner | 222/158 |
| 5,067,638 | | 11/1991 | Bavaveas | 222/205 |
| 5,078,289 | | 1/1992 | Bolton et al. | 215/228 |
| 5,119,971 | | 6/1992 | Reyman | 222/129 |
| 5,127,553 | | 7/1992 | Weinstein | 222/158 |
| 5,154,702 | | 10/1992 | Foyil | 604/212 |
| 5,174,478 | | 12/1992 | Reyman | 222/207 |
| 5,228,586 | | 7/1993 | Fuchs | 222/38 |
| 5,251,792 | | 10/1993 | Sheen | 222/205 |
| 5,259,536 | | 11/1993 | Reyman | 222/207 |
| 5,261,569 | | 11/1993 | Sandwell | 222/205 |
| 5,330,081 | | 7/1994 | Davenport | 222/207 |
| 5,363,991 | | 11/1994 | Reyman | 222/207 |
| 5,363,992 | | 11/1994 | Meshberg | 222/309 |
| 5,392,966 | * | 2/1995 | Bunin | 222/454 |
| 5,413,233 | * | 5/1995 | Hall | 215/209 |
| 5,484,070 | | 1/1996 | Graham | 215/223 |
| 5,497,915 | | 3/1996 | Wass | 222/153.07 |
| 5,551,607 | | 9/1996 | DeJonge, Sr. et al. | 222/505 |
| 5,584,420 | | 12/1996 | Awada et al. | 222/153.09 |
| 5,636,756 | * | 6/1997 | Johnson | 215/206 |
| 5,636,765 | | 6/1997 | DeJonge | 222/107 |
| 5,669,530 | | 9/1997 | Cichon et al. | 222/153.09 |
| 5,695,093 | | 12/1997 | Lucius | 222/129 |
| 5,746,349 | | 5/1998 | Putteman et al. | 222/49 |
| 5,769,278 | | 6/1998 | Kummer et al. | 222/158 |
| 5,788,098 | | 8/1998 | Mader | 215/219 |
| 5,791,504 | | 8/1998 | Hofmann et al. | 215/223 |
| 5,803,283 | | 9/1998 | Barker et al. | 215/230 |
| 5,819,968 | | 10/1998 | Jones | 215/222 |
| 5,833,124 | | 11/1998 | Groves et al. | 222/158 |
| 5,865,330 | | 2/1999 | Buono | 215/216 |

* cited by examiner

SQUEEZE DISPENSER

FIELD OF THE INVENTION

The present invention relates to a dispenser for liquids, more specifically a dispenser particularly well suited for dispensing liquids which contain pharmaceutically active ingredients.

BACKGROUND OF THE INVENTION

Containers with a reservoir in which a measured dose of liquid are filled are known in the art. Typically these containers have an upper reservoir into which the liquid is filled, and which contains markings to indicate the level of fluid to be dispensed, see for example U.S. Design Pat. Nos. 278,118 and 316,815. However, these containers are not designed for delivering variable accurate dosages. While this might be acceptable for products such as mouthwash, these containers are not well suited for dispensing pharmaceutical ingredients.

Despite the disclosures of the prior art there is an ongoing need to provide dispensers which deliver accurate dosages of liquids easily while also provides child resistant features.

SUMMARY OF THE INVENTION

The present invention provides in a first embodiment a container for dispensing liquids, said container comprising: a lower reservoir and an upper reservoir separated by a gasket having an aperture therethrough; a longitudinal tube extending through said gasket, said tube having a lower end extending into said lower reservoir, an upper end extending into said upper reservoir, whereby when pressure is applied to said lower reservoir, liquid in said lower reservoir can travel through said tube and into said upper reservoir, said upper end of said tube having a longitudinal slot extending therethrough; and a dispensing tip having a longitudinal sleeve extending therefrom, said longitudinal sleeve having a helical aperture extending therethrough, said sleeve is disposed concentrically around said upper end of said tube such that it can rotate around said tube, whereby the maximum amount of liquid that can be maintained in said upper reservoir is controlled by said helical slit's position with respect to said longitudinal slot.

In a second embodiment the present invention provides a container for dispensing liquids, said container comprising a lower reservoir and an upper reservoir in fluid communication with each other and separated by a gasket having an aperture therethrough; a longitudinal tube extending through said gasket, said tube having a lower end extending into said lower reservoir, an upper end extending into said upper reservoir, whereby when pressure is applied to said lower reservoir, liquid in said lower reservoir can travel through said tube and into said upper reservoir, said upper end of said tube having a slot extending therethrough; a dispensing tip having a longitudinal sleeve extending therefrom, said longitudinal sleeve having a slot extending therethrough, said sleeve is disposed concentrically around said upper end of said tube such that said tube and sleeve can move relative to each other, whereby the maximum amount of liquid that can be maintained in said upper reservoir is controlled by changing the position of said slots relative to each other.

Another embodiment of the invention provides a container for dispensing liquids, said container comprising: a lower reservoir and an upper reservoir in fluid communication with each other; a means for delivering liquid from said lower reservoir to said upper reservoir upon the application of pressure to said lower reservoir; and a means for dosing and varying the maximum amount of liquid that can be maintained in said upper reservoir.

Yet another embodiment provides a container for dispensing liquids, said container comprising a lower reservoir and an upper reservoir in fluid communication with each other; a device that delivers liquid from said lower reservoir to said upper reservoir upon the application of pressure to said lower reservoir; and a dosing device that can and vary the maximum amount of liquid that can be maintained in said upper reservoir.

These embodiments as well as other features of the present invention will be understood upon reading the specification and accompanying drawings.

DETAILED DESCRIPTION OF THE INVENTION

The present invention provides a resilient, flexible container which when the walls of the container are deformed, the contents of the container are forced up the longitudinal tube, or referred to as the fill tube, into the upper reservoir. When the pressure on the container walls is decreased the liquid in the upper reservoir drains back into the bottle until the desired dosage is selected. Upon the satisfactory filling of the upper reservoir, the user inverts the bottle, typically to a near vertical position. The lower end of the fill tube is no longer submerged in the contents of the container. The user then applies pressure on the container walls thereby forcing air into the straw such that sufficient pressure is developed to assist gravity in dispensing liquid out of the dispenser tip.

Figure 1:
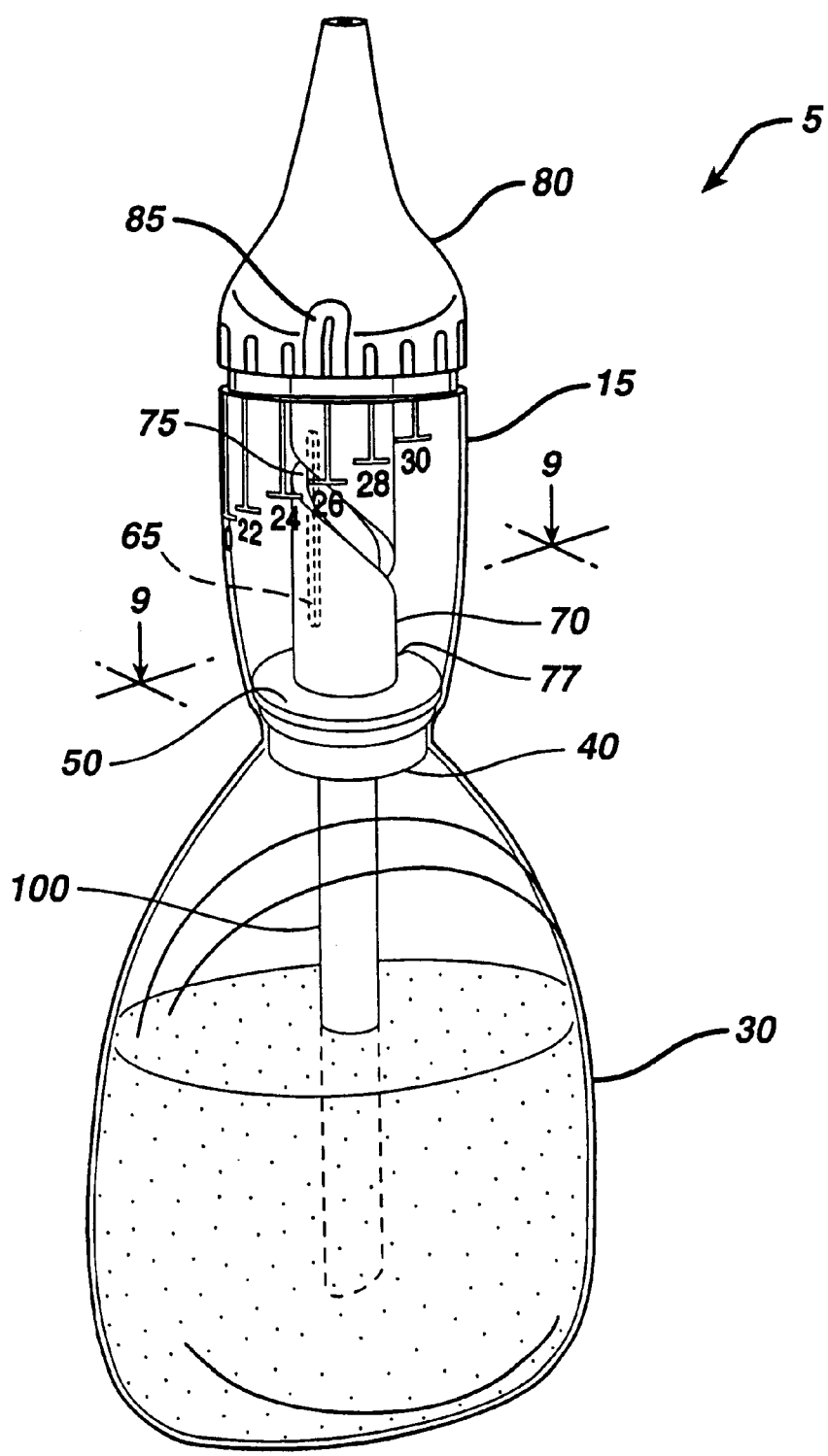
FIG. 1 is a perspective view of the container with the upper reservoir empty.

Referring now to the Figures, FIG. 1 depicts the container 5 with the upper reservoir 15 empty of liquid. As depicted in this drawing liquid will collect in the upper reservoir. A gasket 40 is formed which separates the lower reservoir 30 from the upper reservoir and prevents liquid from draining from the upper reservoir to the lower reservoir. The outer sleeve 70 contains an aperture 75 as well as drain notch 77. The fill tube 100 is shown which passes from the lower reservoir through an opening in the gasket and into the upper reservoir. This permits liquid to be transferred from the lower to upper reservoirs. The dispensing tip 80 is shown with the dosage indicator 85. The aperture in the inner sleeve 65 and the gasket 40 between the upper and lower reservoirs are also depicted.

Figure 2:
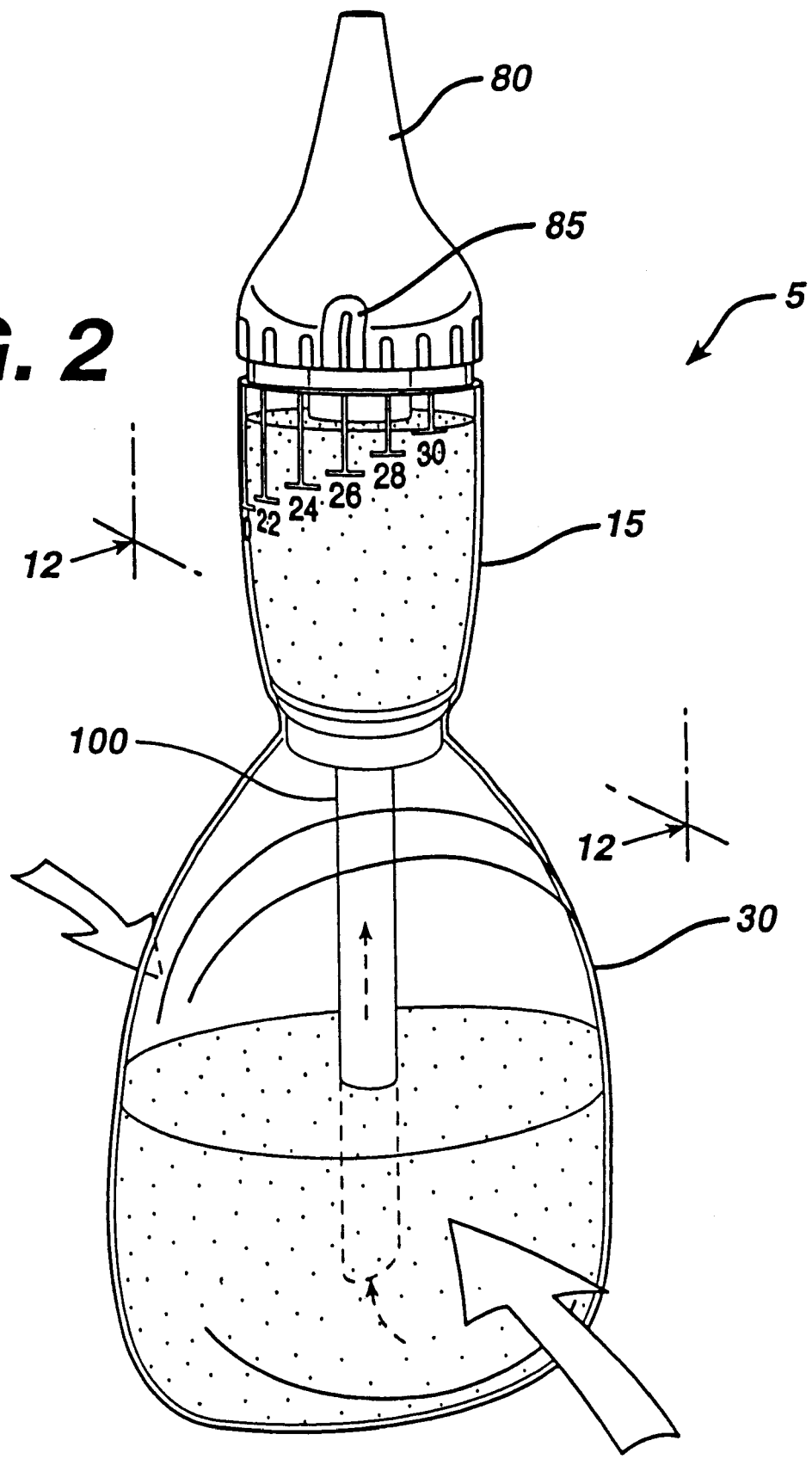
FIG. 2 is a perspective view of the container with pressure applied to the wall of the lower reservoir of the container.
Figure 3:
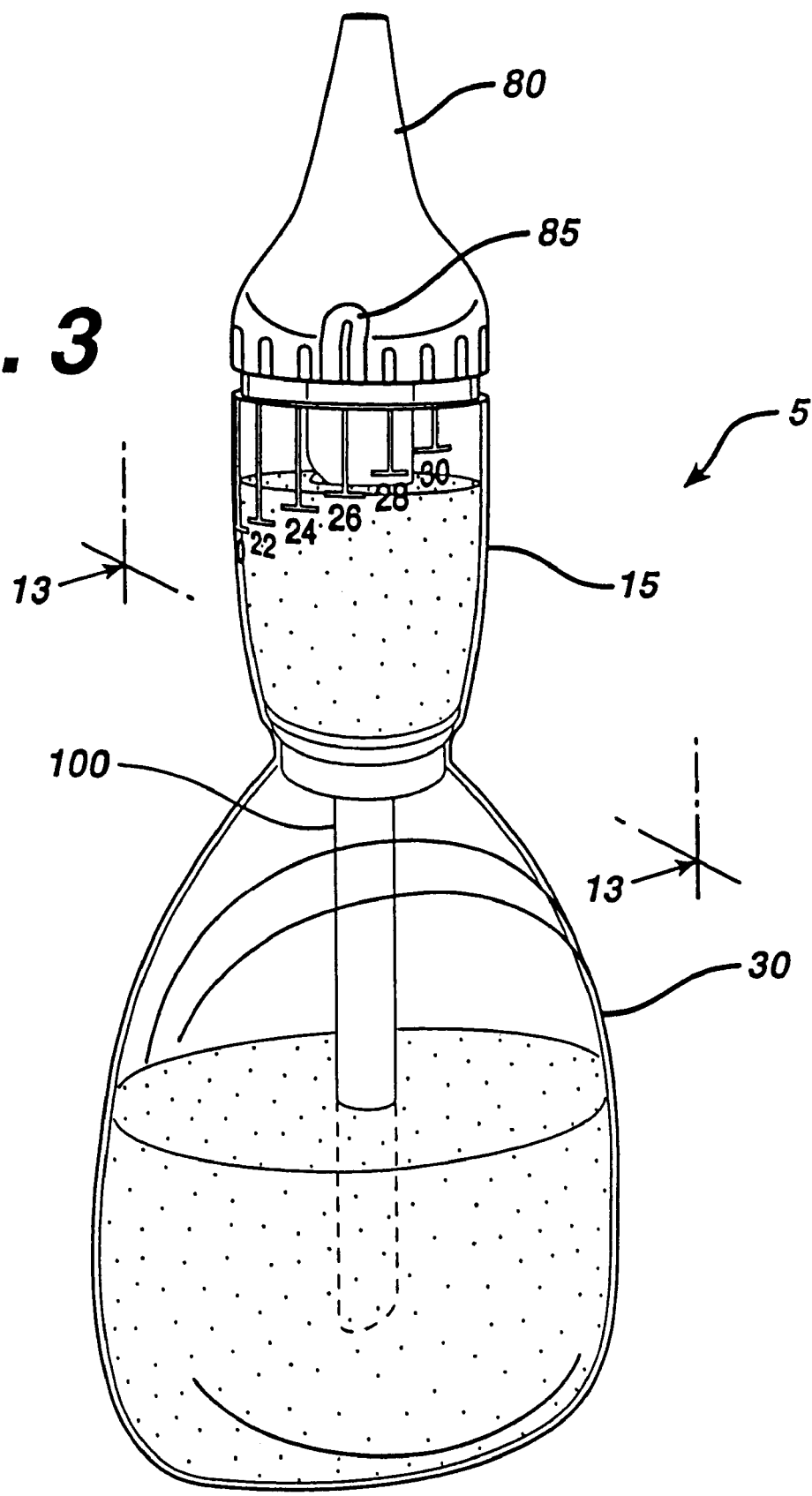
FIG. 3 is a perspective view of the container with the upper reservoir filled to the desired level.

FIG. 2 depicts pressure being applied to the lower reservoir 30 of the container by the arrows thereby forcing liquid up the fill tube 100 into the upper reservoir 15 to the desired dosage, numeral 26 as indicated by the dosage indicator 85. The level of liquid in the upper reservoir is above the indicated dosage 85 so long as pressure is maintained on the lower reservoir. FIG. 3 demonstrates the liquid dosage in the upper reservoir at the desired dosage as determined by the dosage indicator 85 on the dispensing tip 80. Any excess liquid which was transferred to the upper reservoir was returned to the lower reservoir when the pressure on the lower reservoir is removed.

Figure 4:
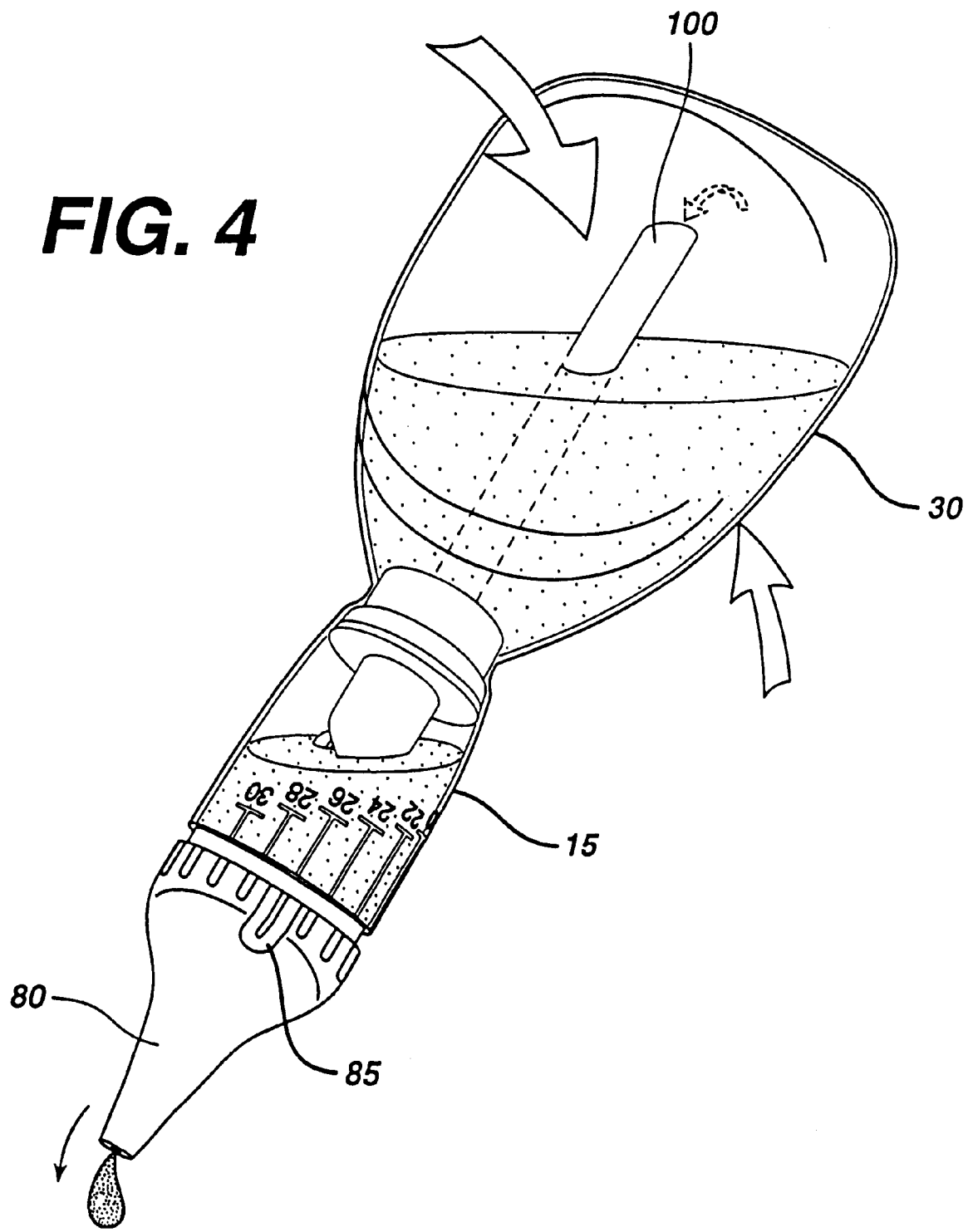
FIG. 4 is a perspective view of the container in an inverted position.

FIG. 4 depicts the container in an inverted position in which the liquid in the upper reservoir is dispensed to the consumer by applying pressure on the walls of the lower container. The fill tube is positioned near the bottom of the container so that when inverted an air space is created. When force is applied to the lower reservoir 30, higher pressure air is created which is forced into the upper reservoir through the fill tube 100, thereby aiding in the dispensing of liquid from the upper reservoir 15 and dispensing tip 80.

Figure 5:
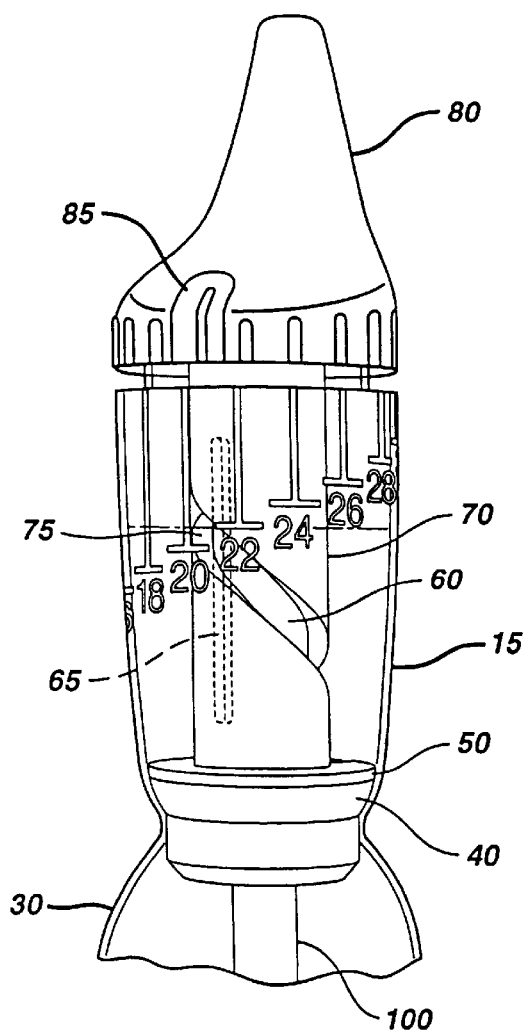
FIG. 5 is an enlarged perspective view of the dispensing indicator of the upper reservoir.

FIG. 5 depicts the dispensing tip 80 and the dosage indicator 85 positioned at the numeral 20, which could designate the appropriate dosage for a child whose weight is 20 pounds. The helical aperture 75 on the outer sleeve 70 and the corresponding liquid level is apparent. The dotted line 65 indicates the aperture in the inner sleeve 60. The base of the outer sleeve 50 and the gasket 40 are depicted in an arrangement which retains liquid in the upper reservoir 15.

Figure 6:
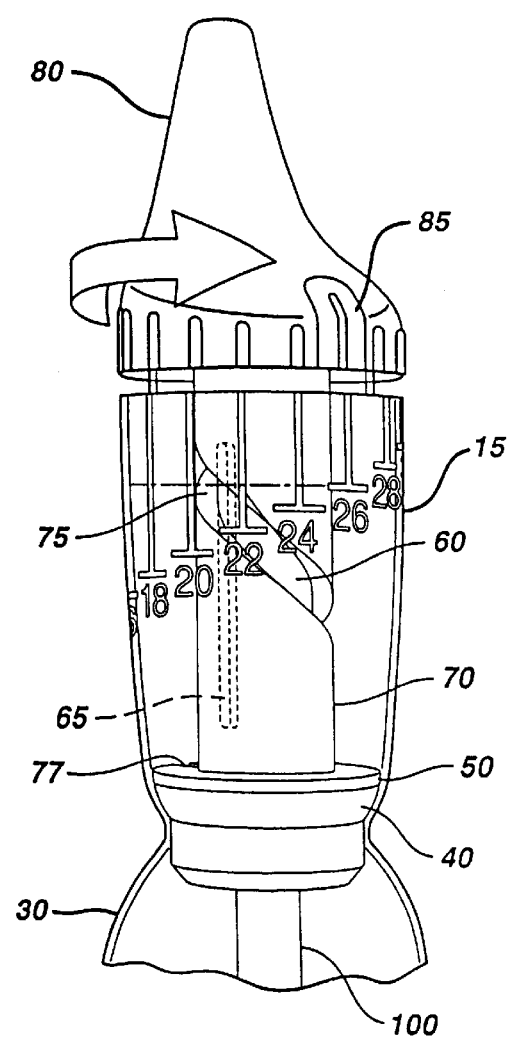
FIG. 6 is and enlarged perspective view of the dispensing indicator of the upper reservoir.

FIG. 6 demonstrates the counterclockwise rotation of the dispensing tip 85 to numeral 26 and the corresponding change in the height of the helical aperture 75 found in the outer sleeve. The dotted line depicts the aperture in the inner sleeve 65. The drain 77 in the base 50 of the outer sleeve 70 is visible. The optional gasket is depicted as an additional piece in the assembly, however those with skill in the art will appreciated that the gasketmay be eliminated if its sealing function is incorporated into another element, such as the inner sleeve.

Figure 7:
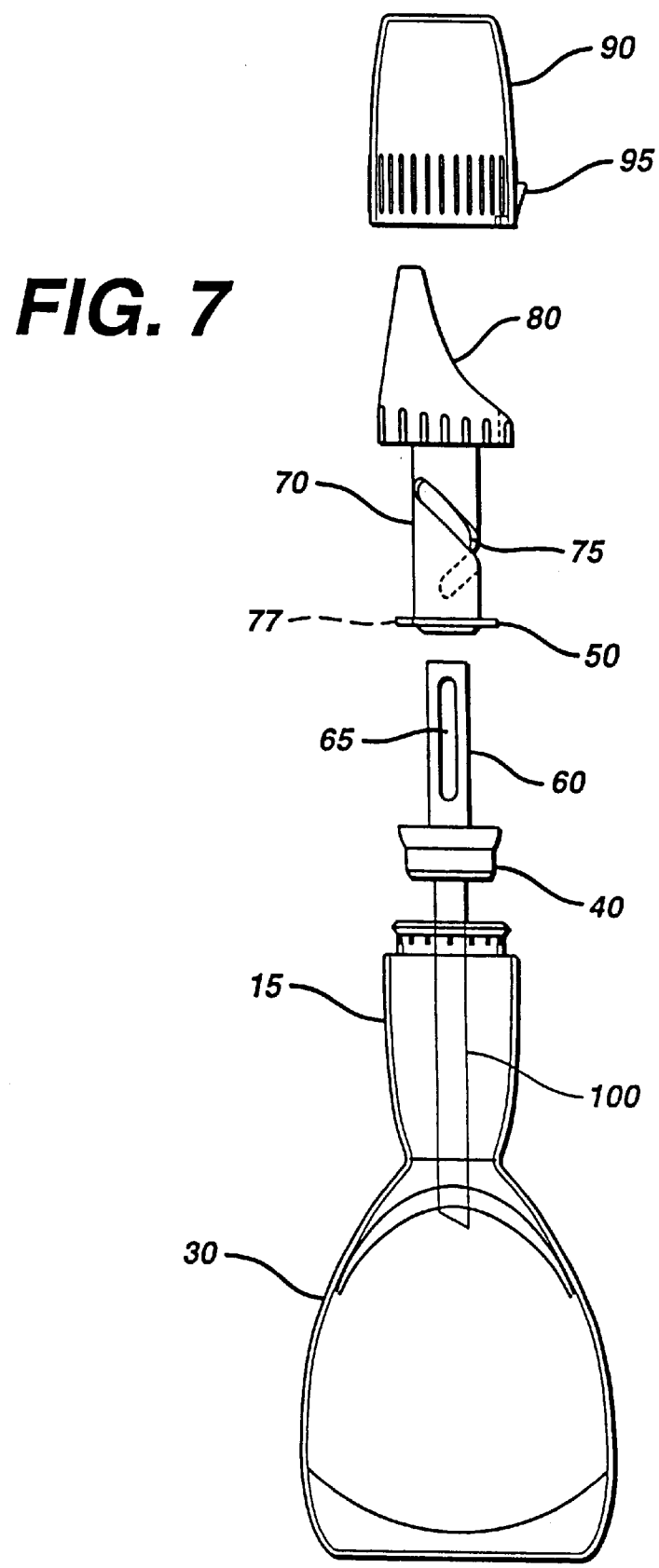
FIG. 7 is an exploded elevational view of container.

FIG. 7 depicts the various elements in an exploded front view with the cap 90, with cap child resistant tab 95, dispensing tip 80, dosage indicator 85, outer sleeve 70, with helical aperture 75, drain 77, inner sleeve 60, aperture 65, base of outer sleeve 50, a gasket 40, the upper reservoir 15, lower reservoir 30, and fill tube 100. The inner sleeve is preferably held in a stationary position which improves the liquid seal between the upper and lower reservoirs.

Figure 8:
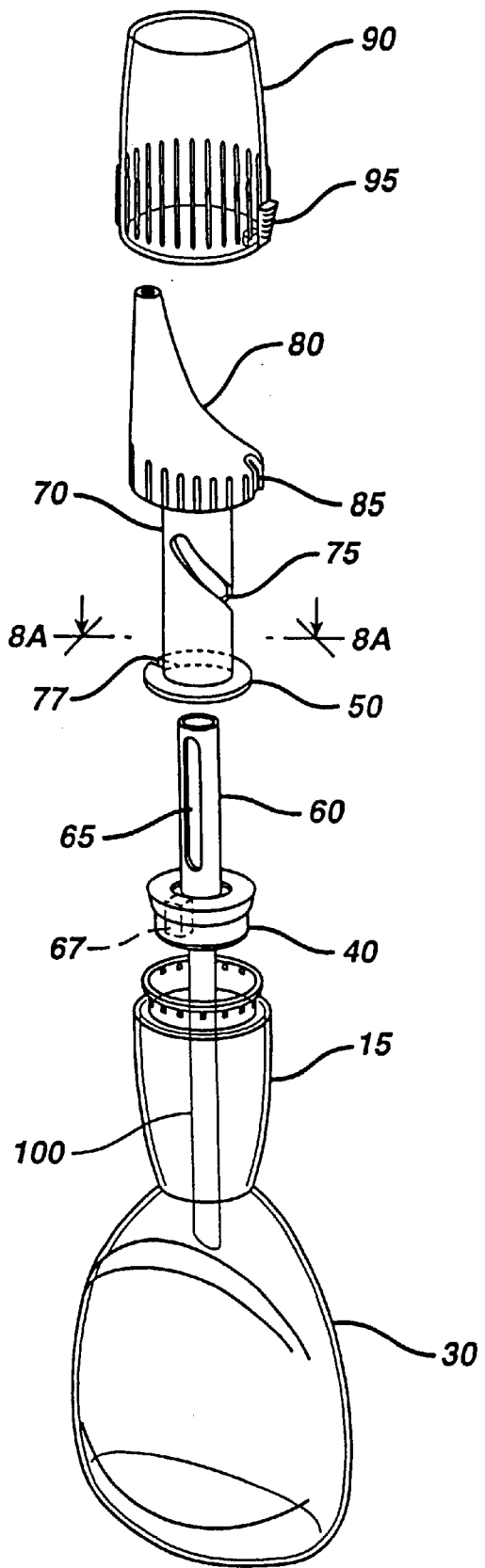
FIG. 8 is an exploded perspective view of the container.
Figure 8A:
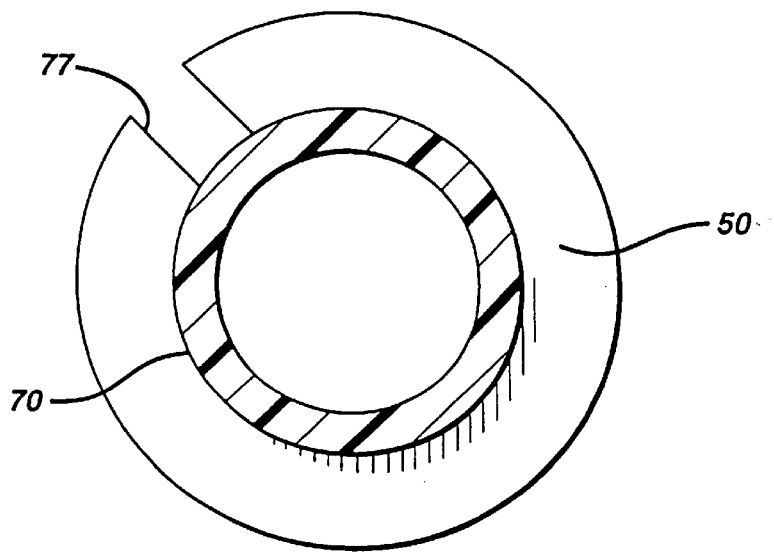
FIG. 8A is a top view of the outer sleeve of the container.

FIG. 8 is an exploded side view of the container with the cap 90, with child resistant tab 95, dispensing tip 80, outer sleeve 70, with helical aperture 75, drain 77, inner sleeve 60, aperture 65, inner sleeve drain 67, outer sleeve base 50, a gasket 40, the upper reservoir 15, lower reservoir 30, and fill tube 100. One with skill in the art will readily appreciate that an alignment of the inner sleeve drain 67 and outer sleeve drain 77 over each other will allow liquid to empty from the upper reservoir to the lower reservoir. FIG. 8A is a top view of the outer sleeve 70, depicting the drain 77 in the base of the outer sleeve 50.

Figure 9:
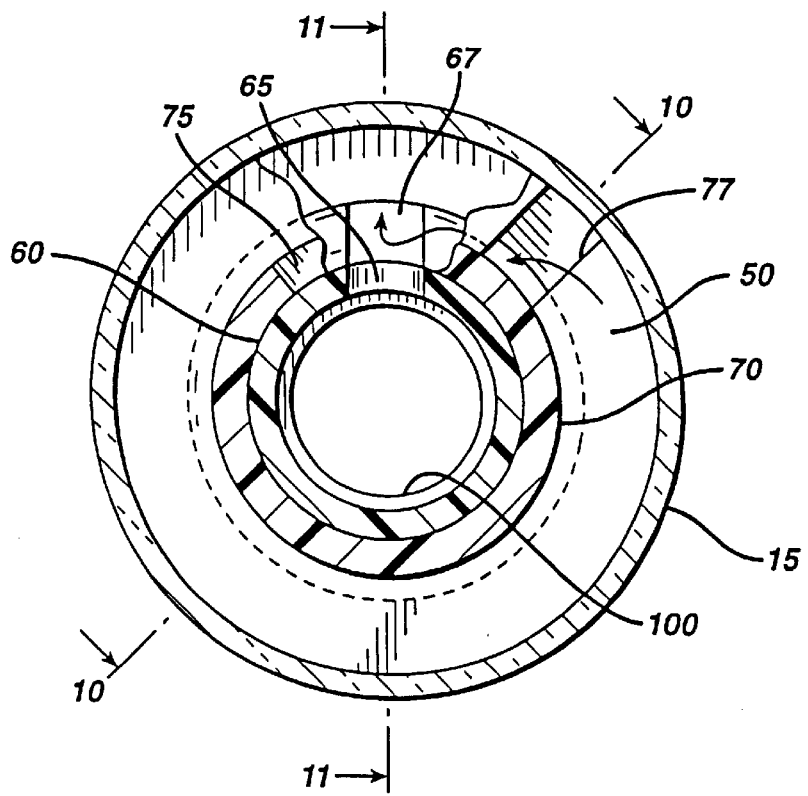
FIG. 9 is a cross sectional view taken along line 9—9 of FIG. 1.

FIG. 9 is a cross sectional view taken along line 9—9 of FIG. 1. The fill tube 100, the inner sleeve 60, and the outer sleeve 70 are depicted. The outer sleeve aperture 75 is depicted by the counter clockwise rotation of the arrows terminating in the area marked by axis line 11—11. The inner sleeve aperture 65 is also visible in the inner sleeve 60. In FIG. 9, the inner sleeve drain 67 and the outer sleeve drain are not aligned over each other. In this arrangement, the liquid from the lower reservoir will fill the upper reservoir to the desired level.

Figure 10:
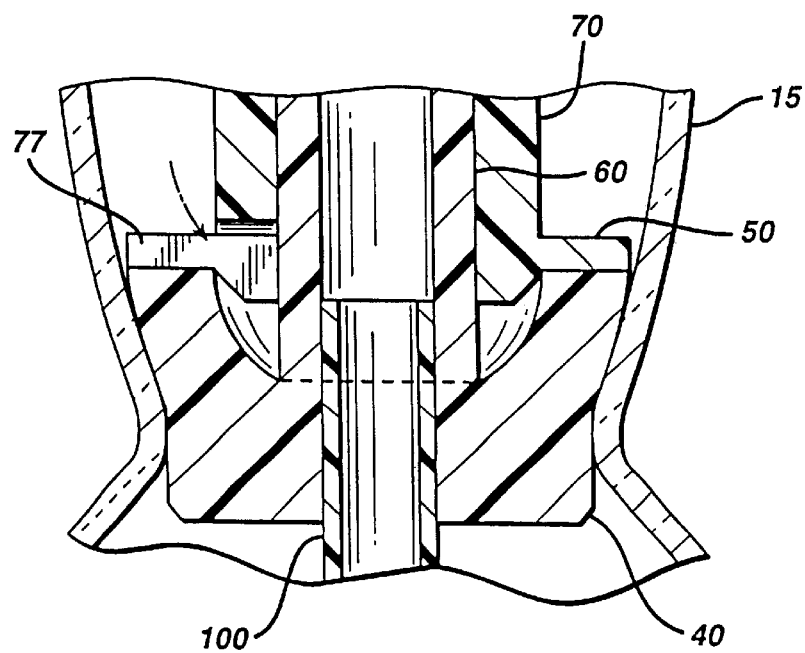
FIG. 10 is a cross sectional view taken along line 10—10 of FIG. 9.
Figure 11:
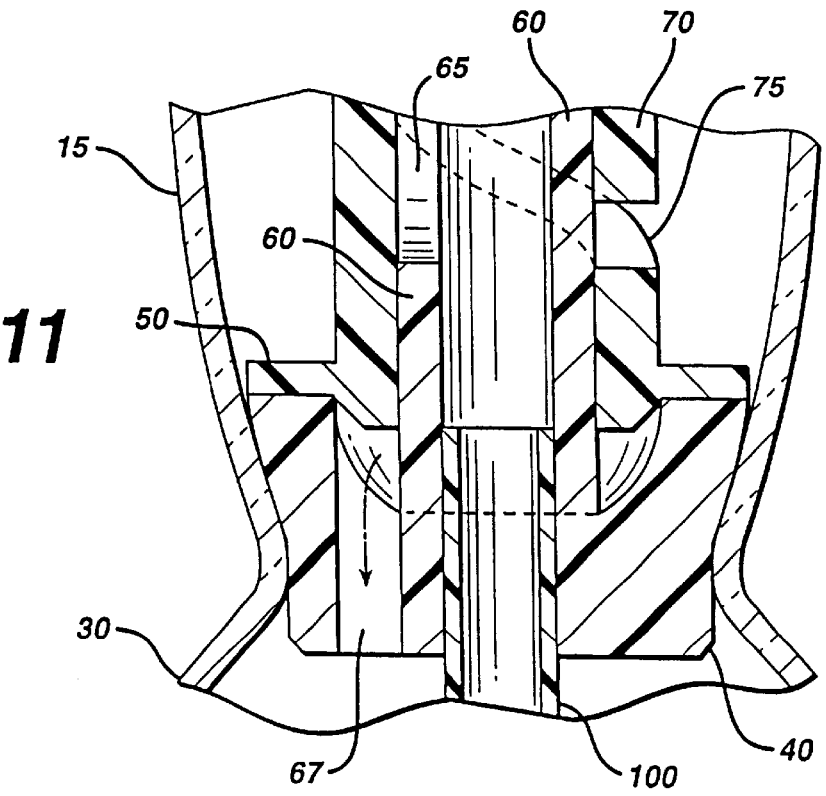
FIG. 11 is a cross sectional view taken along line 11—11 of FIG. 9.

FIG. 10 is a cross sectional view taken along line 10—10 of the FIG. 9. The drain 77 in the outer sleeve 70 is visible, as is the base 50 of the outer sleeve. The gasket 40 is also depicted. The longitudinal fill tube 100 is in fluid communication with the inner sleeve 60, thus providing liquid to the upper reservoir. FIG. 11 is a cross sectional view taken along the line 11—11 of FIG. 9. The helical aperture 75 in the outer sleeve 70 is apparent. The inner sleeve 60, the aperture 65 and the inner sleeve drain 67, vertical arrow, are also depicted. When the drain from inner sleeve is in proper alignment with the drain in the upper sleeve (not shown) liquid is permitted to drain from the upper reservoir 15 through the gasket into the lower reservoir 30.

Figure 12:
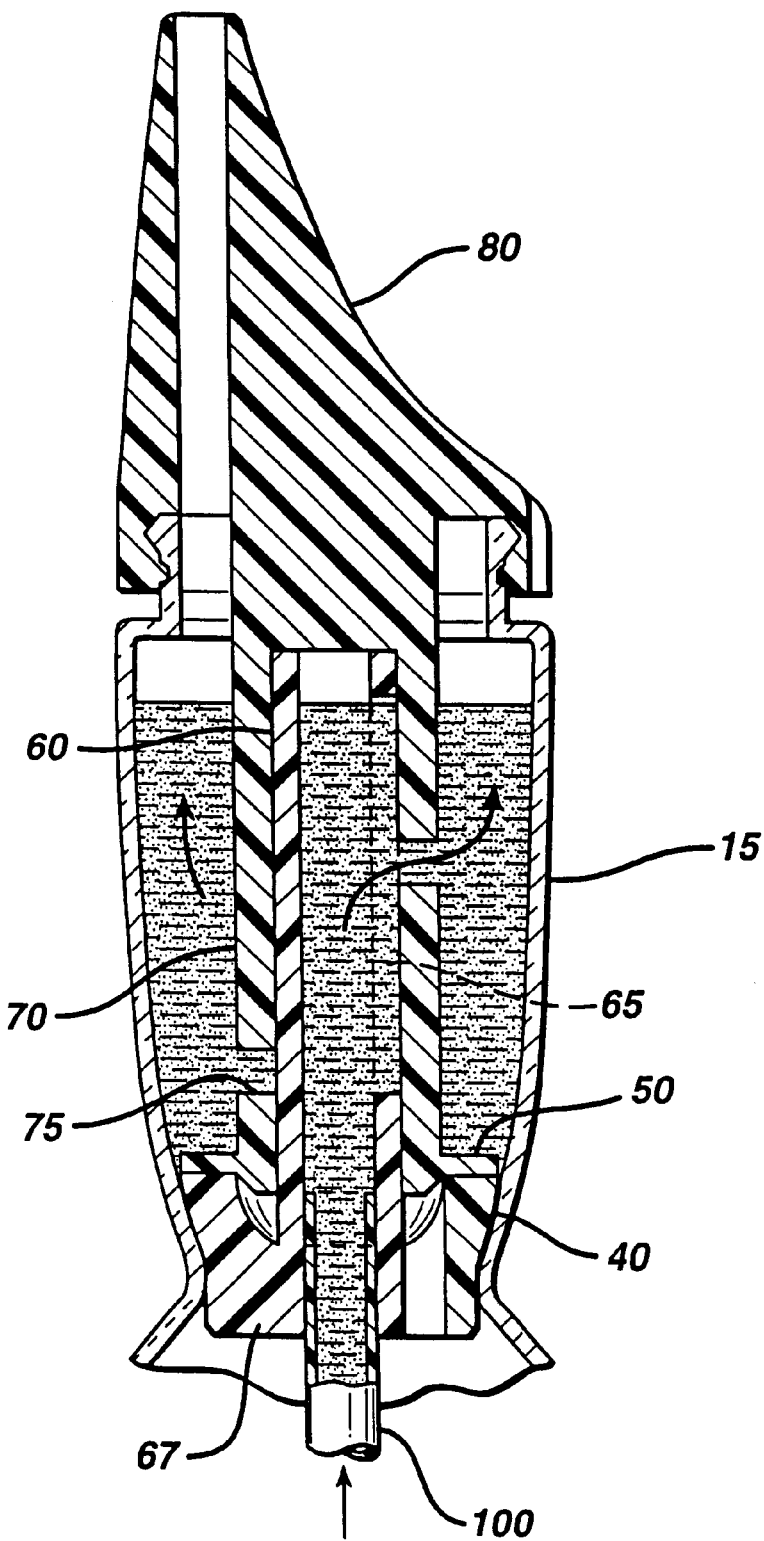
FIG. 12 is a cross sectional view taken along line 12—12 of FIG. 2.

FIG. 12 is a cross sectional view taken along line 12—12 of FIG. 2. The liquid is being forced up the fill tube 100 filling the upper reservoir 15 with liquid. The liquid exits the outer sleeve helical opening 75 in the outer sleeve 70 thereby filling the reservoir. The inner sleeve drain 67 and the outer sleeve drain 77 (not depicted) are not in alignment thereby preventing liquid from draining through the outer sleeve base 50 through the gasket 40 into the lower reservoir.

Figure 13:
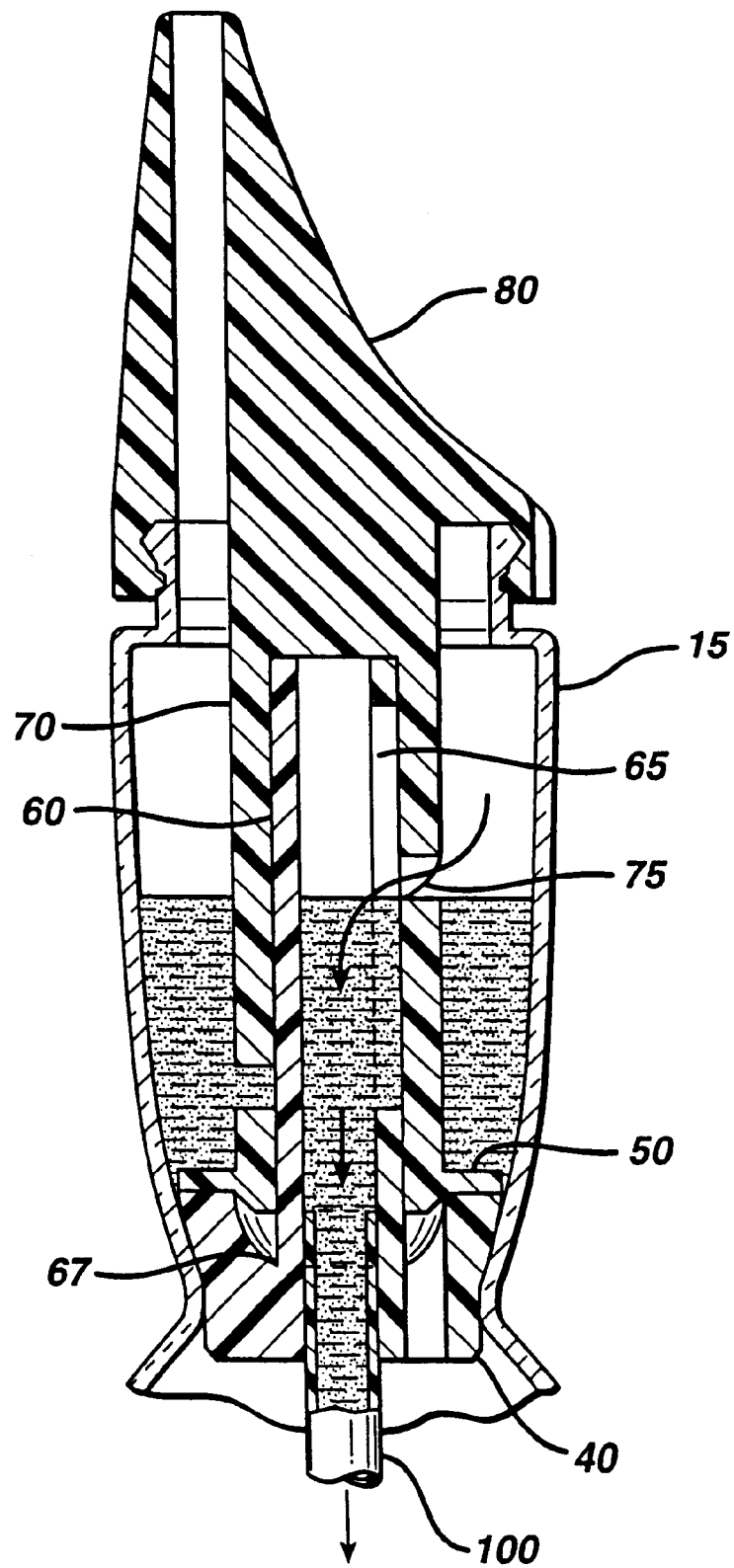
FIG. 13 is a cross sectional view taken along line 13—13 of FIG. 3.

FIG. 13 is a cross sectional view taken along line 13—13 of FIG. 3. When pressure is no longer applied to the lower reservoir (not shown) the liquid level in the upper reservoir is permitted to empty down through the fill tube which in turn permits liquid in the upper reservoir to drain through outer sleeve helical aperture 75 in the and inner sleeve aperture 65. This outer sleeve helical aperture acts as a weir to control the liquid level in the upper reservoir which will be administered to the patient. The other parts are as described in FIG. 12.

The present invention provides several advantages over the containers of the prior art. The accuracy of the dosage of the present invention is better than those containers previously disclosed. In addition, the present invention provides the ability to drain the upper reservoir back into the lower reservoir through the proper alignment of openings in inner sleeve and outer sleeve. Containers previoulsy disclosed did not provide for the draining of liquid from the upper reservoir into the lower reservoir. Consequently, if the upper reservoir was filled beyond the desired level, the excess liquid would be discarded. This is acceptable for relatively inexpensive materials, however, it is economically undesirable to discard pharmaceutically active ingredients.

All of the parts described herein are preferably made of polymeric materials such that they are readily shaped, molded and fitted together. Suitable polymers include, but are not limited to polyethylene, polypropylene, polyethylene terphthalate and the like.

The term child-resistant is understood to those with skill in the packaging arts. These packages require a level of cognitive skills such that most children can not gain access to the contents of the dispenser. Numerous child-resistant means are known in the art, including but not limited to alignment of tabs or flaps to open the container top, a plurality of grooves and channels which require the user to push down on the container top to engage the grooves, the requirement to push ears or tabs on the sides to that the top can be twisted off and the like other techniques for providing child resistant packages are disclosed in U.S. Pat. Nos. 5,788,098; 5,791,505; 5,803,203; 5,819,968 and 5,865,330. The preferred embodiment of the present invention are the use of tabs which must be aligned before the cap can be removed.

The present invention is particularly well suited to dispense solutions which contain a pharmaceutical agent. The present invention can be used to dispense any liquids, including solutions, dispersions and suspensions. Suitable pharmaceutically acceptable dispersants and suspending agents are well known in the art, see for example, *Remington*

*Pharmaceutical Sciences*, 15<sup>th</sup> Edition. Techniques for making such suspensions and dispersions are known to those with skill in the art, see for example, U.S. Pat. Nos. 5,272,137; 5,374,659; 5,409,907; 5,621,005; and 5,658,919; the contents of which are incorporated by reference. In particular, the dispensing tip can be marked to provide the correct dosage of the product based upon the weight of the child. The weight can be expressed in any convenient unit such as pounds, kilograms and the like.

The present invention may be used to deliver many active medicaments that are well known in the art. U.S. Pat. No. 4,929,508 provides a suitable list of such medicaments and the relevant portions of the patent are hereby incorporated by reference. The form of the medicaments are not critical in the invention so long as they may be incorporated into a liquid. The original form of the pharmaceutically active ingredient before incorporation into the liquid may be solids, liquids, powders, pellets and the like.

Especially preferred medicaments to be delivered by the present invention include ibuprofen, acetaminophen, aspirin, pseudoephedrine, pseudoephedrine hydrochloride, chlorpheniramine maleate, dextromethorphan hydrobromide, diphenhydramine, loratadine, phenylpropanolamine and diphenydramine hydrochloride.

Commonly known pharmaceutically acceptable additives for orally-administered drugs such as sweeteners, colorings, flavoring agents, buffering agents and the like may be included in the formulations. Suitable sweeteners include sugar, sorbitol, saccharin, mannitol, glucose, aspartame and the like. Flavoring agents include peppermint, spearmint cinnamon, bubble gum, vanilla and the like.

All U.S. patents disclosed herein are hereby incorporated by reference as if set forth herein by their entirety.

We claim:

1. A container for dispensing liquids, said container comprising:
    a. a lower reservoir and an upper reservoir separated by a gasket, said gasket having an aperture therethrough and comprising an inner sleeve drain;
    b. a longitudinal tube extending through said gasket, said tube having a lower end extending into said lower reservoir, and an upper end extending into said upper reservoir, whereby when pressure is applied to said lower reservoir, liquid in said lower reservoir can travel through said tube and into said upper reservoir, said upper end of said tube having a longitudinal slot extending therethrough;
    c. a dispensing tip having a longitudinal sleeve extending therefrom, said longitudinal sleeve having a helical slit extending therethrough and comprising a base comprising an outer sleeve drain, said sleeve being disposed concentrically around said upper end of said tube such that it can rotate around said tube, whereby the maximum amount of liquid that can be maintained in said upper reservoir is controlled by the relative positions of said helical slit and said longitudinal slot and the relative positions of said inner sleeve drain and said outer sleeve drain.

2. The container of claim 1 wherein the container is additionally provided with a cap.

3. The container of claim 2 wherein the cap is provided with means to render the container child resistant.

4. The container of claim 3 wherein the means to render the container child resistant comprise a tab on the cap, said tab being alignable with a notch on the dispensing tip.

5. The container of claim 1 wherein the dispensing tip provides a plurality of markings which correspond to the weight of a child.

6. The container of claim 5 wherein the markings are expressed in units selected from the group consisting of pounds, kilograms and fractions of thereof.

7. The container of claim 1 wherein the dispensing tip provides a plurality of markings which correspond to volume of liquid to be dispensed.

8. The container of claim 7 wherein the markings are expressed in units selected from the group consisting of teaspoons, milliliters, cubic centimeters, fluid ounces and fractions thereof.

9. A container for dispensing liquids, said container comprising:
    a. a lower reservoir and an upper reservoir in fluid communication with each other and separated by a gasket said gasket having an aperture therethrough and comprising an inner sleeve drain;
    b. a longitudinal tube extending through said gasket, said tube having a lower end extending into said lower reservoir, and an upper end extending into said upper reservoir, whereby when pressure is applied to said lower reservoir, liquid in said lower reservoir can travel through said tube and into said upper reservoir, said upper end of said tube having a slot extending therethrough;
    c. a dispensing tip having a longitudinal sleeve extending therefrom, said longitudinal sleeve having a slot extending therethrough, and comprising a base comprising an outer sleeve drain, said sleeve being disposed concentrically around said upper end of said tube such that said tube and sleeve can move relative to each other, whereby the maximum amount of liquid that can travel through said tube from said lower reservoir to said upper reservoir is controlled by changing the relative positions of said slots and the relative positions of said sleeve drains.

10. The container of claim 9 wherein the container is additionally provided with a cap.

11. The container of claim 10 wherein the cap is provided with means to render the container child resistant.

12. The container of claim 11 wherein the means to render the container child resistant comprise a tab on the cap, the tab being alignable with a notch on the dispensing tip.

13. The container of claim 9 wherein the dispensing tip provides a plurality of markings that correspond to the weight of a child.

14. The container of claim 13 wherein the markings are expressed in units selected from the group consisting of pounds, kilograms and fractions thereof.

15. The container of claim 9 wherein the dispensing tip provides a plurality of markings that correspond to the volume of liquid to be dispensed.

16. The container of claim 15 wherein the markings are expressed in units selected from the group consisting of teaspoons, milliliters, cubic centimeters, fluid ounces and fractions thereof.

* * * * *